United States Patent [19]

Yamamoto et al.

[11] Patent Number: 5,039,756
[45] Date of Patent: Aug. 13, 1991

[54] VULCANIZABLE EPOXY GROUP-CONTAINING ELASTOMER COMPOSITION

[75] Inventors: Keisaku Yamamoto; Nobuyuki Yoshida; Masahiro Fukuyama, all of Chiba; Masahiro Ichinose, Kanagawa, all of Japan

[73] Assignee: Sumitomo Chemical Co., Ltd., Osaka, Japan

[21] Appl. No.: 376,490

[22] Filed: Jul. 7, 1989

[30] Foreign Application Priority Data

Jul. 8, 1988 [JP] Japan .................. 63-171343

[51] Int. Cl.$^5$ .............................. C08F 8/34
[52] U.S. Cl. ..................... 525/340; 525/327.3; 525/332.8; 525/332.9; 525/333.1; 525/333.2; 525/352; 525/368; 525/369; 525/374
[58] Field of Search .......... 525/327.3, 352, 374; 525/340, 368, 364

[56] References Cited

U.S. PATENT DOCUMENTS

| | | | |
|---|---|---|---|
| 3,317,491 | 5/1967 | Kanavel | 525/352 |
| 3,622,547 | 11/1971 | Ermidis | 525/352 |
| 3,694,388 | 9/1972 | Connelly et al. | 525/374 |
| 4,281,085 | 7/1981 | Ikeda et al. | 525/374 |

FOREIGN PATENT DOCUMENTS 56-61439   5/1981 Japan .
56-152854 11/1981 Japan .
63-57629   3/1988 Japan .

*Primary Examiner*—Bernard Lipman
*Attorney, Agent, or Firm*—Sughrue, Mion, Zinn Macpeak & Seas

[57] ABSTRACT

A vulcanizable epoxy group-containing elastomer composition is disclosed, which comprises:
(A) an epoxy group-containing elastomer having compounded therewith
(B) an organic compound having at least two linkages, per molecule, of the formula

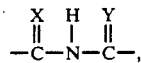

wherein X and Y are each oxygen atom or sulfur atom, or one of X and Y is oxygen atom and the other is sulfur atom;
(C) a quaternary ammonium salt and/or a quaternary phosphonium salt;
(D) a compound having one linkage, per molecule, of the formula

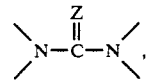

wherein Z is oxygen atom or sulfur atom; and
(E) calcium oxide or a combination of calcium oxide and calcium hydroxide.

5 Claims, No Drawings

VULCANIZABLE EPOXY GROUP-CONTAINING ELASTOMER COMPOSITION

FIELD OF THE INVENTION

This invention relates to a vulcanizable epoxy group-containing elastomer composition and more particularly to a vulcanizable epoxy group-containing elastomer composition which is excellent in scorch stability and storage stability as well as in compression set in a high-temperature atmosphere.

BACKGROUND OF THE INVENTION

Components imparting double bonds, components imparting carboxyl groups and components having epoxy groups are known as crosslinking sites of elastomer compositions. There is known a method wherein calcium oxide is added to elastomer compositions containing a component imparting double bonds as a crosslinking site to improve compression set [see, JP-A-56-61439 (the term "JP-A" as used herein means an "unexamined published Japanese patent application") and JP-A-56-152854]. However, when this method comprising adding calcium oxide is applied to elastomer compositions containing a component imparting carboxyl groups as a crosslinking site, there is practically a problem that scorch is caused.

Generally, there are widely used polyamines, diamine carbamates, ammonium organic carboxylates, dithiocarbamates and imidazoles as vulcanization systems for epoxy group-containing elastomers as crosslinking sites. However, when these vulcanization systems are applied to the epoxy group-containing elastomers, there are disadvantages that when the elastomers are excellent in compression set, they are inferior in scorch stability, while when they are excellent in scorch stability, they are inferior in compression set.

In order to solve these disadvantages, there have been made studies to find a vulcanization system which gives epoxy group-containing elastomers, which are excellent in scorch stability as well as in compression set. For example, JP-A-63-57629 discloses the use of organic compounds having a specific structure and quaternary ammonium salts or quaternary phosphonium salts to provide a vulcanization system which gives excellent scorch stability as well as excellent compression set. However, requirements for compression set have been made more rigorous recently. For example, it is required that excellent compression set must be kept even in a high-temperature atmosphere of as high as 170° C. or higher. A vulcanization system giving excellent compression set under such severe conditions has not been found out as yet.

SUMMARY OF THE INVENTION

The present invention is intended to solve such problems associated with the conventional technologies as mentioned above.

An object of the present invention is to provide a vulcanizable epoxy group-containing elastomer composition which is excellent in scorch stability as well as in compression set even in a high-temperature atmosphere of as high as 170° C. or higher.

The present inventors have made studies to find out a vulcanizable elastomer excellent in compression set in a high-temperature atmosphere as well as in scorch stability. As a result, the present invention has been performed.

Accordingly, present invention provides a vulcanizable epoxy group-containing elastomer composition, which comprises:

(A) an epoxy group-containing elastomer having compounded therewith (B) an organic compound having at least two linkages, per molecule, of the formula

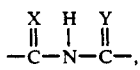

wherein X and Y are each oxygen atom or sulfur atom, or one of X and Y is oxygen atom and the other is sulfur atom;

(C) a quaternary ammonium salt and/or a quaternary phosphonium salt;

(D) a compound having one linkage, per molecule, of the formula

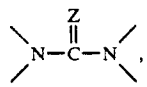

wherein Z is oxygen atom or sulfur atom; and (E) calcium oxide or a combination of calcium oxide and calcium hydroxide.

DETAILED DESCRIPTION OF THE INVENTION

The epoxy group-containing elastomer which can be used as the component (A) of the present invention is (a) an epoxidized elastomer or (b) an epoxy group-containing elastomer prepared by polymerizing from 0.1 to 10% by weight, preferably from 0.5 to 3% by weight, of an epoxy group-containing monomer with from 90 to 99.9% by weight, preferably from 3 to 99.5% by weight, of at least one monomer having a terminal vinyl group(s) or a terminal vinylidene group(s) copolymerizable therewith by any of conventional methods such as emulsion polymerization, suspension polymerization, solution polymerization and bulk polymerization methods.

Epoxy groups of the epoxy group-containing monomer function as crosslinking sites. Examples of such monomers include glycidyl acrylate, glycidyl methacrylate, vinylglycidyl ether, allylglycidyl ether and methallylglycidyl ether. Among them, glycidyl acrylate and glycidyl methacrylate are preferred.

Examples of the monomer having a terminal vinyl group(s) or a terminal vinylidene group(s) copolymerizable with the epoxy group-containing monomer include acrylates (such as methyl acrylate, ethyl acrylate, propyl acrylate, n-butyl acrylate, n-octyl acrylate, methoxymethyl acrylate, methoxyethyl acrylate and ethoxyethyl acrylate) and corresponding methacrylates; vinyl esters (such as vinyl acetate, vinyl propionate and vinyl butyrate); vinyl ketones (such as methyl vinyl ketone and ethyl vinyl ketone); aromatic vinyl compounds (such as styrene, α-methylstyrene and vinyltoluene); conjugated dienes (such as butadiene and isoprene); α-monoolefins (such as ethylene, propylene and 1-butene); vinyl monomers having a hydroxyl group(s) (such as β-hydroxylethyl acrylate and 4-hydroxybutyl acrylate); and vinyl or vinylidene monomers having a nitrile group(s) (such as acrylonitrile, methacrylonitrile and β-cyanoethyl acrylate). These monomers may be used either alone or in combination of two or more of them.

Examples of the epoxy group-containing elastomer which can be used as the component (A) of the present invention include epoxy group-containing acrylate copolymer elastomers, epoxy group-containing ethylene-vinyl acetate copolymer, epoxy group containing ethylene-acrylate copolymer, epoxy group-containing ethylene-vinyl acetate-acrylate copolymer, epoxy group-containing ethylene-propylene copolymer elastomers, epoxy group-containing butadiene-acrylonitrile copolymer elastomers, epoxy group-containing acrylate-acrylonitrile copolymer elastomers, epoxy group-containing butadiene-styrene copolymer elastomers, and epoxy group-containing butadiene-acrylonitrile-acrylate copolymer elastomers. There can be used any of epoxy group-containing elastomers having as a cross-linking site, obtained by a copolymerization reaction of an epoxy group-containing monomer as an ingredient or by epoxidizing an elastomer thereof.

The component (B) of the present invention is an organic compound having at least two linkages, per molecule, of the formula

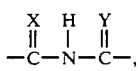

wherein X and Y are each oxygen atom or sulfur atom, or when one of them is oxygen atom, the other is sulfur atom, such as a heterocyclic compound, an aromatic compound or an aliphatic compound. The term "at least two linkages" as used herein means that two or more of the linkages exist independently, or two or more of the linkages are allowed to be joined with each other to form a unit of e.g.,

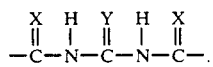

Further, the linkage may be allowed to exist as a substituent group or groups of a heterocyclic compound without existing as a member which forms the ring of the heterocyclic compound.

Examples of the heterocyclic compound include parabanic acid, alloxan, alloxantin, alloxan-5-oxime, barbituric acid, 5-hydroxybarbituric acid, 5-benzalbarbituric acid, 5-aminobarbituric acid, 5-hydroxyiminobarbituric acid, 5,5-diethylbarbituric acid, 5-ethyl-5-phenylbarbituric acid (barbital), 5-(1-methylbutyl)-5-(allyl)barbituric acid, 5,5-diallylbarbituric acid, isocyanuric acid, pseudouric acid, and compounds where the oxygen atom of the

group in the above-described compounds is substituted by sulfur atom, as well as 2,4-dithiobarbituric acid and 2-thiobarbituric acid.

Examples of the aromatic compound include pyromellitic acid diimide, 1,4,5,8-naphthaldimide and corresponding thioimides.

Examples of the aliphatic compound include triuret, 1-methyltriuret, 1,1-diethyltriuret, tetrauret and corresponding thiourets.

The component (B) may be added during the course of the polymerization of the epoxy group-containing elastomer as the component (A) or at the time of the completion of the polymerization reaction. Alternatively, the component (B) together with other additives such as a reinforcing agent may be mixed with the elastomer in a kneader which is conventionally used in the field of rubber industry.

The amount of the component (B) to be added is generally in the range of from 0.1 to 10 parts by weight per 100 parts by weight of the epoxy group-containing elastomer (component (A)) from the viewpoints of the rate of cure, mechanical characteristics of vulcanized products and compression set. When the amount of the component (B) is less than 0.1 part by weight, the cross-linking density of the resulting product is low and practically usable vulcanized products cannot be obtained, while when the amount is more than 10 parts by weight, the rate of cure is greatly retarded. A preferred amount is in the range of from 0.2 to 5 parts by weight.

The quaternary ammonium salt or quaternary phosphonium salt which can be used as the component (C) of the present invention is a compound represented by the following formula.

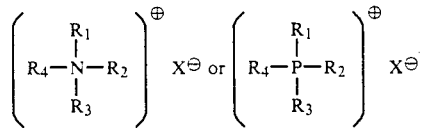

In the above formula, $R_1$ to $R_4$ are each a hydrocarbon group having from 1 to about 25 carbon atoms, such as an alkyl group, an aryl group, an alkylaryl group or a polyoxyalkylene group, or two or three of $R_1$ to $R_4$ may be groups which are taken together to form a heterocyclic ring together with the nitrogen atom or phosphorus atom.

X is an anion derived from an inorganic or organic acid where acidic hydrogen is attached to a halogen atom or oxygen. Preferred examples of the group X include anions such as Cl, Br, I, $HSO_4$, $H_2PO_4$, $R_5COO$, $R_5OSO_3$, $R_5SO$ and $R_5OPO_3H$ ions (wherein $R_5$ is a hydrocarbon group having from about 21 to about 25 carbon atoms, such as an alkyl group, an aryl group, an alkylaryl group or a polyoxyalkylene group).

Examples of the quaternary ammonium salt include tetrabutylammonium chloride, tetrabutylammonium bromide, tetrabutylammonium iodide, n-dodecyltrimethylammonium bromide, cetyldimethylbenzylammonium chloride, methylcetylbenzylammonium bromide, cetyldimethylethylammonium bromide, octadecyltrimethylammonium bromide, cetyl pyridinium chloride, cetyl pyridinium bromide, 1,8-diazabicyclo(5.4.0)undecene-7-methylammonium methosulfate, 1,8-diazabicyclo(5.4.0)undecene-7-benzylammonium chloride, cetyltrimethylammonium alkylphenoxypoly(ethyleneoxy)ethyl phosphates, cetylpyridinium iodide, cetylpyridinium sulfate, tetraethylammonium acetate, trimethylbenzylammonium p-toluenesulfonate, trimethylbenzylammonium benzoate and trimethylbenzylammonium borate.

Examples of the quaternary phosphonium salt include triphenylbenzylphosphonium chloride, triphenylbenzylphosphonium bromide, triphenylbenzylphosphonium iodide, triphenylmethoxymethylphosphonium chloride, triethylbenzylphosphonium chloride, tricyclohexylbenzylphosphonium chloride, trioctylmethylphosphoniumdimethyl phosphate, tetrabutylphosphonium bromide and trioctylmethylphosphonium acetate.

These quaternary ammonium salts or quaternary phosphonium salts may be used either alone or in combination of two or more of them. The amount of the quaternary salt to be added is generally in the range of from 0.1 to 10 parts by weight per 100 parts by weight of the epoxy group-containing elastomer (component (A)) from the viewpoints of the rate of cure, processing stability, storage stability, mechanical properties of vulcanized products and compression set. When the amount of the quaternary salt is less than 0.1 part by weight, curing scarcely proceeds, while when the amount is more than 10 parts by weight, the rate of cure is extremely expedited and processing stability and storage stability are deteriorated. A preferred amount of the quaternary salt is in the range of from 0.1 to 5 parts by weight.

The component (D) of the present invention is a compound having one linkage, per molecule, of the formula

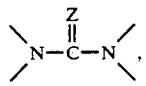

wherein Z is oxygen atom or sulfur atom. Examples of the compound of the component (D) include aliphatic ureas (such as urea, N-methylurea, N-ethylurea, N,N-dimethylurea, N,N-diethylurea, N,N'-diethylurea, N,N'-ethylideneurea, N-acetylurea, N acetyl-N'-methylurea, N,N'-dimethylolurea, tetramethylurea, carbamylurea and carbamoylcarbamic acid) and corresponding thioureas; aromatic ureas (such as phenylurea, N-ethyl-N'-phenylurea, N,N'-diphenylurea, N,N-diphenylurea, N,N-diphenylurea, N-acetyl-N-phenylurea, N-benzoylurea, tetraphenylurea and N,N-dimethyl-N,N'-dichlorophenylurea) and corresponding aromatic thioureas; and heterocyclic ureas (such as ethyleneurea, glycolylurea, dimethylparabanic acid, benzimidazolone and 5-methyluracil) and corresponding heterocyclic thioureas.

These compounds may be used either alone or in combination of two or more of them. The amount of the component (D) to be added is generally in the range of from 0.1 to 10 parts by weight per 100 parts by weight of the epoxy group-containing elastomer as the component (A) from the viewpoints of scorch stability, mechanical characteristics of vulcanized products and compression set. When the amount of the component (D) is less than 0.1 part by weight, the rate of cure cannot be sufficiently controlled, while when the amount is more than 10 parts by weight, the rate of cure is extremely retarded and it is of no practical use. A preferred amount of the component (D) is in the range of from 0.1 to 5 parts by weight.

Further, calcium oxide or a combination of calcium oxide and calcium hydroxide is used as the component (E) of the present invention.

If desired, calcium oxide may be processed into a paste by using an oil to prevent water in air from being absorbed thereby. The amount of calcium oxide to be added is generally in the range of from 0.1 to 20 parts by weight per 100 parts by weight of the epoxy group-containing elastomer as the component (A) from the viewpoints of scorch stability, mechanical characteristics of vulcanized products and compression set. When the amount of calcium oxide is less than 0.1 part by weight, an effect of improving compression set in a high-temperature atmosphere is insufficient, while when the amount is more than 20 parts by weight, scorch stability is poor. A preferred amount is in the range of from 1 to 10 parts by weight.

Calcium oxide can be used in combination with calcium hydroxide to improve compression set in a high-temperature atmosphere. The ratio of calcium hydroxide to calcium oxide is preferably in the range of from 0.05/1 to 1/1 by weight.

The vulcanizable epoxy group-containing elastomer composition according to the present invention can be obtained by mixing the epoxy group-containing elastomer (A) with the above-described components (B) to (E) and additives conventionally used in the field of rubber industry, such as a reinforcing agent, a filler, a plasticizer, an antioxidant, a stabilizer and a processing aid, in a conventional mixer such as a roll mill or a Bandury mixer.

The resulting composition is molded into a desired shape according to the purpose and processed into a final product.

Vulcanization is carried out at a temperature of generally not lower than 120° C., preferably from 150° to 220° C. for from 1 to 60 minutes. Further, when secondary vulcanization is carried out at a temperature of from 150° to 200° C. for a relatively short time of, e.g., from 4 to 16 hours, compression set in a high-temperature atmosphere can be greatly improved.

The vulcanizable epoxy group-containing elastomer composition according to the present invention has excellent compression set in a conventional temperature atmosphere (about 150° C.) as well as in a higher temperature atmosphere and is also excellent in mechanical characteristics. Hence, the composition of the present invention is useful in the fields of various sealing materials (such as gasket, packing, O-ring, and oil seal), various hoses, various belts and rollers.

The present invention is now illustrated in greater detail by reference to the following examples which, however, are not to be construed as limiting the present invention in any way.

EXAMPLES 100 parts by weight of an ethylene-acrylic ester-glycidyl methacrylate copolymer having a composition given in Table 1 as the epoxy-group containing elastomer (A), 40 parts by weight of FEF carbon black (Seast SO ®, a product of Tokai Carbon KK), 2 parts by weight of an amine-based antioxidant (Naugard ®445, a product of Uniloyal Corp.), one part by weight of stearic acid and other compounding additives in a ratio given in Table 2 were kneaded by using an 8-inch roller to obtain a blend.

Mooney scorch time of each of the resulting blends was measured according to JIS K 6300.

Each blend was press-cured at 170° C. for 20 minutes and then subjected to secondary vulcanization under conditions given in Table 2. The vulcanization characteristics of each of the resulting vulcanized products were measured according to JIS K 6301. The results are shown in Table 2.

According to the present invention, there can be obtained a vulcanizable epoxy group-containing elastomer composition which has greatly improved compression set particularly in a high-temperature atmosphere at a temperature of as high as not lower than 170° C. without detriment to scorch stability.

TABLE 1

| Composition | Epoxy Group-Containing Elastomer (A) | |
|---|---|---|
| | A-1 | A-2 |
| Ethylene (wt %) | 38 | 37.5 |
| Methyl acrylate (wt %) | 60 | 60 |
| Glycidyl methacrylate (wt %) | 2.0 | 2.5 |
| $ML_{1+4}$ 100° C. | 18 | 13 |

TABLE 2

| | Test No. | | | | | | | | | |
|---|---|---|---|---|---|---|---|---|---|---|
| | 1 | 2 | 3 | 4 | 5 | 6 | 7 | 8 | 9 | 10 |
| Epoxy Group-Containing Elastomer (A) | A-1 | A-1 | A-1 | A-2 | A-1 | A-1 | A-1 | A-2 | A-1 | A-1 |
| Isocyanuric acid | 0.8 | 0.8 | 0.8 | 0.8 | 0.8 | 0.8 | 0.8 | 0.8 | — | 0.8 |
| OTMeABr*[1] | 1.5 | 1.5 | 1.5 | 1.5 | 1.5 | 1.5 | 1.5 | 1.5 | — | 1.5 |
| N,N'-Diphenylurea | 2.3 | 2.3 | 2.3 | 2.3 | 2.3 | 2.3 | 2.3 | 2.3 | — | 2.3 |
| Calcium oxide | 3 | 5 | 10 | 5 | 5 | 5 | — | — | — | — |
| Calcium hydroxide | — | — | — | — | 1 | 2 | — | — | — | 3 |
| Hexamethylenediamine carbamate | — | — | — | — | — | — | — | — | 1.25 | — |
| Diphenylguanidine | — | — | — | — | — | — | — | — | 4 | — |
| Secondary vulcanization conditions | 185° C. × 4 hr | ← | ← | ← | ← | ← | ← | ← | ← | ← |
| Mooney scorch time 125° C. | | | | | | | | | | |
| Lowest viscosity | 19.0 | 17.3 | 17.2 | 14.5 | 19.3 | 19.5 | 18.0 | 18.0 | 23.0 | 18.6 |
| $t_5$ (min.) | 16.6 | 16.6 | 15.5 | 16.4 | 20.5 | 19.1 | 19.7 | 15.7 | 9.7 | 16.4 |
| $t_{35}$ (min.) | 45.4 | 46.2 | 46.8 | 43.0 | 51.4 | 49.6 | 52.7 | 39.9 | 19.8 | 44.1 |
| Tensile strength (kgf/cm²) | 179 | 171 | 168 | 151 | 162 | 160 | 174 | 164 | 190 | 157 |
| Elongation (%) | 380 | 370 | 370 | 310 | 380 | 370 | 430 | 330 | 250 | 520 |
| Hardness (JIS-A) | 68 | 69 | 70 | 70 | 69 | 71 | 68 | 68 | 71 | 68 |
| Compression set (%) 150° C. × 70 hr | 29.1 | 27.7 | 27.1 | 25.9 | 30.2 | 26.8 | 37.2 | 27.4 | 54.2 | 53.8 |
| Compression set (%) 175° C. × 70 hr | 55.4 | 52.4 | 47.1 | 50.7 | 56.7 | 51.0 | 77.3 | 68.1 | 83.5 | 81.6 |
| Compression set (%) 185° C. × 70 hr | 75.0 | 70.5 | 67.7 | 64.8 | 69.1 | 65.7 | 87.4 | 80.3 | 90.5 | 88.5 |

*[1]OTMeABr: Octadecyltrimethylammonium bromide

While the invention has been described in detail and with reference to specific embodiments thereof, it will be apparent to one skilled in the art that various changes and modifications can be made therein without departing from the spirit and scope thereof.

What is claimed is:

1. A vulcanizable epoxy group-containing elastomer composition, which comprises:
   (A) an epoxy group-containing elastomer having compounded therewith:
   (B) an organic compound having at least two linkages, per molecule, of the formula

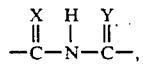

wherein X and Y are each oxygen atom or sulfur atom, or one of X and Y is oxygen atom and the other is sulfur atom;
   (C) a quaternary ammonium salt and/or a quaternary phosphonium salt;
   (D) a compound having one linkage, per molecule, of the formula

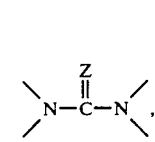

wherein Z is oxygen atom or sulfur atom; and
   (E) calcium oxide or a combination of calcium oxide and calcium hydroxide, wherein the epoxy group-containing elastomer (A) is (a) an epoxidized elastomer or (b) an epoxy group-containing elastomer prepared by polymerizing an epoxy group-containing monomer with at least one copolymerizable monomer having a terminal vinyl group or groups or a terminal vinylidene group or groups, wherein the organic compound (B) is a heterocyclic compound, an aromatic compound or an aliphatic compound and wherein the organic compound (B) is added in the range of from 0.1 to 10 parts by weight per 100 parts by weight of the epoxy group-containing elastomer (A), wherein the quaternary ammonium salt and/or quaternary phosphonium salt (C) is a compound represented by the following formula:

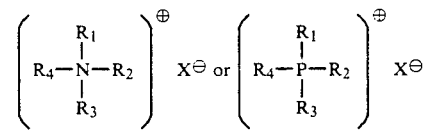

wherein $R_1$ to $R_4$ are each a hydrocarbon group having from 1 to about 25 carbon atoms, or two or three of $R_1$ to $R_4$ are taken together to form a heterocyclic ring together with the nitrogen atom or phosphorus atom; and X is an anion derived from an inorganic or organic acid where acidic hydrogen is attached to a halogen atom or oxygen and wherein the quaternary ammonium salt or quaternary phosphonium salt (C) is added in the range of from 0.1 to 10 parts by weight per 100 parts by weight of the epoxy group-containing elastomer (A), wherein the compound (D) is an aliphatic urea or thiourea, an aromatic urea or thiourea, or a heterocyclic urea or thiourea, and wherein the compound (D) is added in the range of from 0.1 to 10 parts by weight per 100 parts by weight of the epoxy group-containing elastomer (A).

2. A composition as in claim 1, wherein said epoxy group-containing monomer is glycidyl acrylate or glycidyl methacrylate.

3. A composition as in claim 1, wherein said copolymerizable monomer having a terminal vinyl group or groups or a terminal vinylidene group or groups is an acrylate or methacrylate, a vinyl ester, a vinyl ketone, an aromatic vinyl compound, a conjugated diene, an α-monoolefin or a vinyl or vinylidene compound.

4. A composition as in claim 1, wherein the calcium oxide (E) is added in the range of from 0.1 to 20 parts by weight per 100 parts by weight of the epoxy group-containing elastomer (A).

5. A composition as in claim 1, wherein the component (E) is a combination of calcium oxide and calcium hydroxide; the amount of the calcium oxide is in the range of from 0.1 to 20 parts by weight per 100 parts by weight of the epoxy group-containing elastomer (A); and the weight ratio of calcium hydroxyoxide to calcium oxide is from 0.05/1 to 1/1.

* * * * *